3,840,654
PROCESS FOR PREPARING CRYSTALLINE, NON-SOLVATED ALUMINUM HYDRIDE
Donald L. Schmidt and Ronald W. Diesen, Midland, Mich., assignors to The Dow Chemical Company, Midland, Mich.
No Drawing. Filed Oct. 23, 1962, Ser. No. 234,275
Int. Cl. C01b 6/00
U.S. Cl. 423—645            7 Claims

ABSTRACT OF THE DISCLOSURE

Crystalline, substantially non-solvated aluminum hydride is prepared by heating under pressure an ether solution of aluminum hydride. The ether solution preferably contains a complex hydride selected from the group consisting of lithium aluminum hydride, lithium borohydride, and mixtures thereof.

---

This invention relates to the preparation of aluminum hydride and more particularly is concerned with a novel process for preparing substantially solvent-free, particulate, crystalline aluminum hydride in a particle size larger than achieved heretofore.

A number of methods are known for making various polymorphic crystalline phases of aluminum hydride. However, these processes all have the disadvantage in that the resulting products are contaminated with impurities and are essentially all in a very fine state of subdivision, e.g. submicron in size, which renders these undesirable for propellant applications. Also, the resulting products as produced are solvated and the solvent member, i.e. ether, is removed with difficulty ordinarily by high vacuum techniques.

It is a principal object of the present invention to provide a process for preparing crystalline aluminum hydride that is substantially solvent-free.

It is another object of the present invention to provide a process for preparing crystalline aluminum hydride in larger sized particles than obtained heretofore.

It is a further object of the present invention to provide a process for preparing substantially solvent-free aluminum hydride in predetermined crystal phases.

It is an additional object of the present invention to provide a high purity, crystalline aluminum hydride product directly from a solution of the material, which product is substantially solvent-free as produced.

It is still another object of the present invention to provide a process for preparing crystalline aluminum hydride in a particulate form that exhibits a markedly improved stability, ease of handling and compatibility when used in propellant formulation over aluminum hydride products produced by traditional methods.

These and other objects and advantages will become apparent from the detailed description presented hereinafter.

In accordance with the present novel process, aluminum hydride is dissolved in an ether solvent preferably in the presence of a complex metal hydride which is soluble in the solution to provide a solution having an $AlH_3$/ether ratio of from about 0.05 to about 1 on a gram mole basis. This solvent can be any of those ether materials which act as a solvent for aluminum hydride, including for example, dimethyl ether, tetrahydrofuran and the like.

Substantially non-solvated, large-sized, particulate, crystalline aluminum hydride results from the present process by maintaining the ether solution of aluminum hydride at a temperature of from about 50 to about 85° C. thereby to precipitate the preferred form of the aluminum hydride directly therein. Preferably the temperature is maintained from about 60 to about 80° C. and desirably from about 70 to about 75° C.

At these temperatures, crystalline aluminum hydride of particle size of from 10 to 50 microns and larger forms directly in the reaction solution with substantially no ether of solvation combined therewith. This result is surprising and unexpected in view of the fact that the product obtained from the same solutions at lower temperatures both is substantially completely solvated and of undesirably small sized particles.

The time of reaction at the predetermined temperature is not critical except ordinarily the process is continued until a desired concentration of the product auto-crystallizes in the reaction medium. Reaction times of from less than one hour to 6 hours or more have been found to be satisfactory with very good yields being obtained at a minimum reaction time of about 2 hours.

The ether solution of aluminum hydride employed as a starting material in the instant process can be a reaction product mixture resulting from the well-known reaction of $AlCl_3$ and $LiAlH_4$ in an ether, e.g. diethyl ether, or the ether solution of aluminum hydride produced by any other process. Also, a solid solvated aluminum hydride can be redissolved in an ether and this solution then be used in the present novel process. The instant process, therefore, is suitable for use not only in the direct production of the desirable $AlH_3$ product described hereinbefore, but also finds high utility as a means for obtaining a large-sized crystalline, substantially solvent-free, high purity product from previously prepared impure aluminum hydride products.

In carrying out the instant process with low boiling ether solvents the reaction temperatures are obtained by controllably increasing the pressure on the solution while heating thereby to raise the effective boiling point of the solution and give a predetermined reaction temperature. Alternatively, an inert organic solvent having a higher boiling point than the ether can be admixed with the ethereal solution in sufficient quantity to provide a solution having a boiling point of at least 50° C. This solvent should be inert to the aluminum hydride product; that is, it should not react detrimentally with the reaction mixture so as to destroy or change the product and preferably should have a boiling point of above 80° C. Liquid hydrocarbons such as benzene, toluene, biphenyl, xylene, biphenyl benzene, decane and the like are suitable for use in the present process. The amount of solvent to be used is not critical except that this be sufficient to produce the desired boiling point rise in the reaction solution.

Alternatively, a combination of increased pressure on the reaction mass and inert solvent addition to the ether solution can be employed if desired to achieve the desired predetermined elevated temperature of operation.

By further controlling the reaction conditions relative to the treatment of the heated solvent during the process, the directed precipitation of large crystals of substantially non-solvated aluminum hydride in high concentrations of preferential and predetermined phases also is achieved by the present process. To illustrate, if the reaction solution is heated, or refluxed, at the operating temperature without removal of solvent, predominantly the product is large crystals of alpha'-aluminum hydride. This product is identified and characterized in a copending application Ser. No. 234,277 of Norman E. Matzek and Donald F. Musinski, filed Oct. 23, 1962. If the solution is concentrated by removal of solvent during the elevated temperature treatment, predominantly there is produced large crystals of a substantially solvent-free hexagonal aluminum hydride, identified and characterized as alpha-aluminum hydride in a copending application Ser. No.

179,509 of Norman E. Matzek and Donald F. Musinski, filed Mar. 8, 1962.

Complex metal hydrides suitable for use in the instant process are those corresponding to the empirical formula, $M_1M_2H_4$ (wherein $M_1$ and $M_2$ are atoms of different metal cations and sum of the valence of which equals 4). These can be incorporated into and dissolved in the ether solution to provide a complex metal hydride/$AlH_3$ gram mole ratio of from about 0.025 to about 1, and preferably from about 0.25 to 0.5 based on the $AlH_3$ product in the solution. For those solutions wherein the $AlH_3$ is to be recovered directly from a reaction product mixture, for example by interacting $AlCl_3$ and $LiAlH_4$, the amount of $M_1M_2H_4$ to be employed is in excess of that required for the actual preparation of the $AlH_3$ product.

Although any of the complex metal hydrides corresponding to the formula set forth hereinbefore can be employed in the present process, ordinarily $LiAlH_4$, $LiBH_4$ or mixtures of these are employed. Preferably a mixture containing equal parts of $LiAlH_4$ and $LiBH_4$ is employed.

The large crystals of substantially non-crystalline aluminum hydride produced by the present novel process find high utility in propellant compositions.

These crystals offer ease of handling and storage both from the standpoint of formulation and safety. They show a markedly decreased reactivity in air and increased resistance to flashing and burning over the heretofore available submicron particles.

In propellant formulation these large particles exhibit excellent compatibility and blendability with other ingredients employed.

The present invention is illustrated further by the following examples, but is not meant to be limited thereto.

EXAMPLE I

To a solution of a diethyl ether solvated aluminum hydride in diethyl ether (solution concentration—0.76 molar in aluminum hydride) was added 0.13 gram mole $LiAlH_4$ and 0.12 gram mole of $LiBH_4$. The resulting solution was placed in a heavy walled Pyrex glass tube and the tube sealed. The tube reactor was heated at 75° C. for about 3 hours during which time a crystalline solid precipitated in the ether. After this time, the tube was opened in a dry box and the reaction product mixture removed therefrom. The white, crystalline product was washed three times with ether and dried at reduced pressure (about 0.1 millimeter mercury absolute) at room temperature.

The resulting product was found to consist of particles predominantly in the general form of irregularly surfaced spheres and ellipsoids and actually resembled rocks. These were found to have a minimum axis of from about 10 microns to about 50 microns. X-ray diffraction studies indicated the product to be predominantly the substantially ether-free alpha' form of aluminum hydride with less than 5 percent alpha-aluminum hydride and less than 5 percent lithium chloride also being present.

EXAMPLE II

In a nitrogen atmosphere dry box, about 80 milliliters of a 0.938 M solution $AlCl_3$ (0.075 gram mole) in diethyl ether was added with stirring to a second diethyl ether solution of about 300 milliliters of 1 M $LiAlH_4$ (0.3 gram mole). About 75 milliliters of a 1 M $LiBH_4$ (0.075 gram mole) diethyl ether was added and the lithium chloride, which precipitated, was filtered off. About 2445 milliliters of substantially anhydrous benzene was added to the filtrate and the blended solution filtered. The resulting clear solution was seeded with a small amount of alpha phase aluminum hydride and placed in a 3000 milliliter round-bottom flask equipped with a thermowell and a fractionating column with a take-off head. The flask was positioned in an oil bath preheated to 90° C. Diethyl ether was fractionally distilled from the reaction mass over a period of about 2 hours. During this time, the reflux temperature of the reaction mixture rose from about 72° to about 79° C., measured at a pressure of approximately 750 millimeters mercury. Crystalline aluminum hydride started to form in the reaction mass about one hour after heating was started.

After the two hour process treatment, the product mixture was removed from the reactor, cooled and the crystalline, solid particles (about 10 microns or larger) collected under substantially anhydrous conditions. This solid product was washed three times with diethyl ether and dried at a pressure of about 0.1 millimeter mercury absolute. The product recovery was about 7.1 grams indicating a yield of about 79 percent.

X-ray diffraction analysis indicated the product was substantially all alpha-aluminum hydride. Elemental analysis indicated H, 10.02; Al, 88.95; Cl, 0.19; Li, 0.31; B, 0.1; C, 0.15. Calculated for $AlH_3$: H, 10.07; Al, 89.93.

The low carbon content and close agreement of the actual and calculated hydrogen concentration shows the product is substantially ether-free.

EXAMPLE III

The same procedure and apparatus was employed as described in Example II using a reaction mixture of 130 milliliters of 0.965 M $AlCl_3$ (0.125 gram mole) in diethyl ether and 625 milliliters of a 1 M $LiAlH_4$ (0.625 gram mole) diethyl ether solution. The resulting product again was large crystal sized, substantially ether-free alpha-aluminum hydride.

Various modifications can be made in the present invention without departing from the spirit or scope thereof for it is understood that we limit ourselves only as defined in the appended claims.

We claim:

1. A process for preparing crystalline, substantially non-solvated aluminum hydride which comprises;
   (a) providing an ether solution of aluminum hydride, said solution having an aluminum hydride/ether ratio of from about 0.05 to about 1 on a gram-mole basis, and
   (b) heating said solution under pressure at a temperature of from about 50 to about 85° C. without removing said ether therefrom for a period of time sufficient to crystallize the particulate substantially non-solvated, crystalline aluminum hydride therein, and
   (c) recovering said particulate substantially non-solvated, crystalline aluminum hydride therefrom.

2. A process for preparing crystalline, substantially non-solvated aluminum hydride which comprises;
   (a) providing an ether solution of aluminum hydride, said solution having an aluminum hydride/ether ratio of from about 0.05 to about 1 on a gram-mole basis, said solution containing a complex metal hydride selected from the group consisting of lithium aluminum hydride, lithium borohydride and mixtures thereof, and said solution having a complex metal hydride/aluminum hydride gram-mole ratio of from about 0.025 to 1, and
   (b) heating said solution under pressure at a temperature of from about 50 to about 85° C. without removing said ether therefrom for a period of time sufficient to crystallize the particulate substantially non-solvated, crystalline aluminum hydride therein, and
   (c) recovering said particulate substantially non-solvated, crystalline aluminum hydride therefrom.

3. A process for preparing crystalline, substantially non-solvated, large sized crystals of aluminum hydride which comprises;
   (a) providing an ether solution of aluminum hydride, said solution having an aluminum hydride/diethyl ether ratio of from about 0.05 to about 1 on a gram-mole basis, said solution containing a complex metal hydride selected from the group consisting of lithium aluminum hydride, lithium borohydride and mixtures thereof, the gram-mole ratio of said complex metal hydride/aluminum hydride in said solution ranging from about 0.25 to about 0.5,
(b) heating said solution under pressure at a temperature of from about 60 to about 80° C. without removing said ether therefrom, from about 1 to about 6 hours, thereby to crystallize substantially non-solvated, large crystals of aluminum hydride therein, and
(c) recovering said crystalline, substantially non-solvated, large particles of aluminum hydride therefrom.

4. A process for preparing crystalline, substantially non-solvated, large crystals of aluminum hydride which comprises;
(a) providing a diethyl ether solution of aluminum hydride, said solution having an aluminum hydride/diethyl ether ratio of from about 0.05 to about 1 on a gram-mole basis, said solution containing a mixture of about equal molar quantities of lithium aluminum hydride and lithium borohydride, the gram-mole ratio of the complex metal hydride mixture/aluminum hydride in said solution ranging from about 0.25 to about 0.5,
(b) heating said solution under pressure at a temperature of from about 70 to about 75° C. from about 2 to about 6 hours without removing said ether therefrom thereby to crystallize substantially non-solvated, large particles of aluminum hydride therein, and
(c) recovering the crystalline aluminum hydride product therefrom.

5. A process for preparing crystalline, substantially non-solvated, large crystals of aluminum hydride which comprises;
(a) providing a diethyl ether solution of aluminum hydride, said solution having an aluminum hydride/diethyl ether ratio of from about 0.05 to about 1 on a gram-mole basis, said solution containing a mixture of about equal molar quantities of lithium aluminum hydride and lithium borohydride, the gram-mole ratio of the complex metal hydride mixture/aluminum hydride in said solution ranging from about 0.25 to about 0.5,
(b) adding a sufficient amount of an inert organic solvent to said solution to provide a solution having a boiling point of at least 50° C., said solvent having a boiling point of at least about 80° C.,
(c) heating said solution at a temperature of from about 70 to about 75° from about 2 to 6 hours under reflux thereby to crystallize substantially non-solvated, large crystals of aluminum hydride therein, and
(d) recovering the crystalline aluminum hydride product therefrom.

6. A process for preparing crystalline, substantially non-solvated, large crystals of hexagonal crystal form aluminum hydride which comprises;
(a) providing a diethyl ether solution of aluminum hydride, said solution having an aluminum hydride/diethyl ether ratio of from about 0.05 to about 1 on a gram-mole basis, said solution containing a mixture of about equal molar quantities of lithium aluminum hydride and lithium borohydride, the gram-mole ratio of the complex metal hydride mixture/aluminum hydride in said solution ranging from about 0.25 to about 0.5,
(b) heating said solution under pressure at a temperature of from about 70 to about 75° C. from about 2 to about 6 hours while removing said ether therefrom to concentrate said solution thereby to crystallize substantially non-solvent, large crystals of hexagonal crystal form aluminum hydride therein, and
(c) recovering the crystalline hexagonal crystal form aluminum hydride product therefrom.

7. A process for preparing crystalline, substantially non-solvated, large crystals of hexagonal crystal form aluminum hydride which comprises;
(a) providing a diethyl ether solution of aluminum hydride, said solution having an aluminum hydride/diethyl ether ratio of from about 0.05 to about 1 on a gram-mole basis, said solution containing a mixture of about equal molar quantities of lithium aluminum hydride and lithium borohydride, the gram-mole ratio of the complex metal hydride mixture/aluminum hydride in said solution ranging from about 0.25 to about 0.5,
(b) adding a sufficient amount of an inert organic solvent to said solution to provide a solution having a boiling point of at least about 50° C., said solvent having a boiling point at least about 80° C.,
(c) heating said solution at a temperature of from about 70 to about 75° C. from about 2 to 6 hours while fractionally distilling the ether therefrom thereby to crystallize substantially non-solvated, large crystals of hexagonal crystal form aluminum therein, and
(d) recovering the crystalline hexagonal crystal form aluminum hydride product therefrom.

References Cited
UNITED STATES PATENTS 2,468,260    4/1949    Gibb    23—204 X
2,567,972    9/1951    Schlesinger    23—14

OTHER REFERENCES

Chizinsky et al. J. Am. Chem. Soc., Vol. 77, pp. 3164–5 [(1955) Copy available in POSL.]

Hurd. Chemistry of The Hydrides, p. 166 (1952) [Copy available in POSL. QD 181 HI H76.]

CARL D. QUARFORTH, Primary Examiner

R. L. TATE, Assistant Examiner